(12) United States Patent
Girton

(10) Patent No.: US 7,033,265 B1
(45) Date of Patent: Apr. 25, 2006

(54) PRE-PORTIONED FISH FILLET AND METHOD OF MAKING SAME

(75) Inventor: Michael Henry Girton, Seattle, WA (US)

(73) Assignee: Admiralty Island Fisheries, Inc., Seattle, WA (US)

( * ) Notice: Subject to any disclaimer, the term of this patent is extended or adjusted under 35 U.S.C. 154(b) by 0 days.

(21) Appl. No.: 11/128,606

(22) Filed: May 12, 2005

(51) Int. Cl.
*A22C 25/16* (2006.01)

(52) U.S. Cl. ............................................. 452/161
(58) Field of Classification Search ............... 452/161
See application file for complete search history.

(56) References Cited

U.S. PATENT DOCUMENTS 3,653,927 A * 4/1972 Howell et al. .............. 426/412
6,726,944 B1 * 4/2004 Blaschke et al. ........... 426/144

OTHER PUBLICATIONS

Sweet and Sour Pinecone Fish(recipe)@Emeril's.com.*

* cited by examiner

*Primary Examiner*—Thomas Price
(74) *Attorney, Agent, or Firm*—Mann Law Group

(57) ABSTRACT

A pre-portioned fish fillet is provided by cutting a fillet from a fish and thereafter cutting through the flesh side of the fillet to subdivide the fillet into smaller portions. The cuts do not extend fully through the skin so that the fillet remains a single unitary structure. Preferably the cuts do not extend fully across the flesh side of the fillet so that an uncut strip of flesh remains along one edge of the fillet. A paper separator is inserted into each cut and the fillet is frozen. Portions can be removed from the larger frozen fillet by bending the portion along one of the cuts and cutting the skin with a scissors or other implement. Preferably, a flexible, resealable outer sleeve or package is provided so that unused portions of the fillet can be stored for use at a future date.

20 Claims, 2 Drawing Sheets

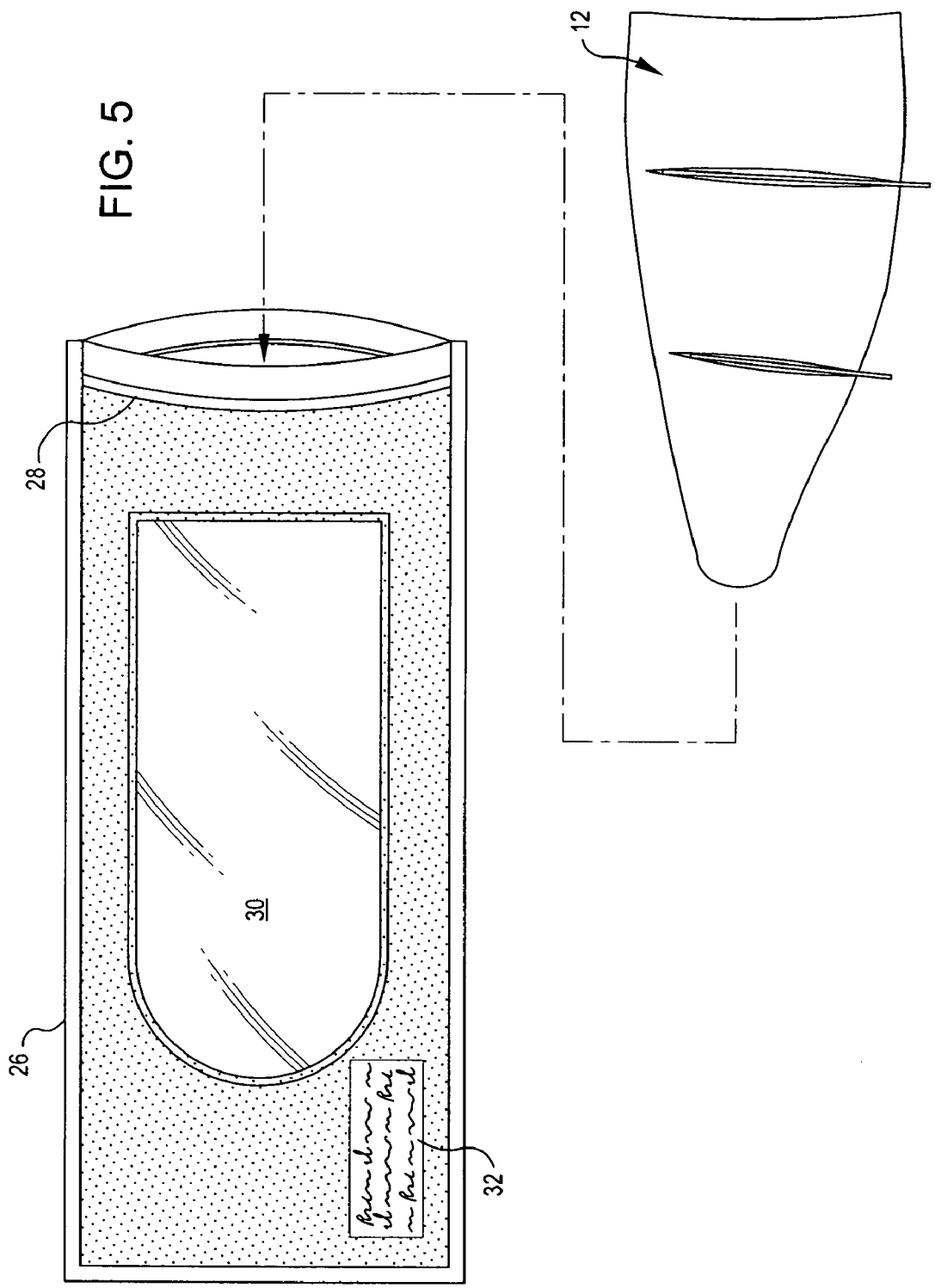

PRE-PORTIONED FISH FILLET AND METHOD OF MAKING SAME

FIELD OF THE INVENTION

This invention relates generally to seafood products and more particularly to fish fillets and methods of processing raw fillets before sale to consumers.

BACKGROUND OF THE INVENTION

One popular method of processing fresh fish before sale to consumers is the process of filleting. Fillets are typically cut from each side of a whole fish between head and tail and consist principally of solid flesh with the skin attached. Some fish, such as salmon and trout, are particularly well suited for filleting due to their size, shape and underlying bone structure. Fillets can be sold fresh for immediate consumption, or they can be sold frozen for consumption at a later date.

In the case of larger fish, such as salmon, each fillet might typically weigh several pounds—far more than adequate to feed one or two people. When such larger fillets are sold in a frozen condition, people who intend to consume less than the whole fillet at one time are faced with a problem of what to do with the unconsumed portion. Cooking the entire fillet provides substantial leftovers that might not be desired for a while. Cutting a frozen fillet into smaller portions is difficult, and thawing the entire fillet to a point permitting easy cutting involves the undesired consequence of re-freezing a previously frozen fillet.

SUMMARY OF THE INVENTION

The invention provides a pre-portioned fish fillet including a fish fillet having fish flesh on one side and skin on the other. A cut extends at least partially through the flesh of the fillet but not through the skin. A separator positioned in the cut permits separation of the flesh along the cut after the fillet is frozen.

The invention also provides a method of producing a pre-portioned fish fillet. The method includes the step of removing from the side of a fish a fillet section having a flesh side and a skin side. The method further includes the step of subdividing the fillet into two or more portions by cutting through the flesh side but not fully through the skin side of the fillet. The method further includes the steps of inserting a separator into the cut formed in the flesh side and freezing the fillet with the separator inserted in the cut.

The invention also provides a pre-portioned fish fillet product including a fish fillet having fish flesh on one side and skin on the other. A plurality of cuts extending at least partially through said flesh of said fillet but not through said skin subdivide the fillet into two or more portions. The cuts extend substantially across the flesh but terminate short of one edge thereof so that a substantially uncut strip of flesh extends substantially fully along one edge of the fillet. The cuts permit separation of the flesh along the cut after the fillet is frozen. A paper separator is positioned in each of the cuts. An outer packaging sleeve is provided for containing and storing the fillet. The outer packaging sleeve is formed of flexible plastic and includes a resealable closure at one end.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements and wherein:

FIG. 5 is a perspective view of a package for containing the fillet shown in FIGS. 1–4, showing the unused portion of the fillet being returned to the package for use at a later date.

DETAILED DESCRIPTION

Figure 1:
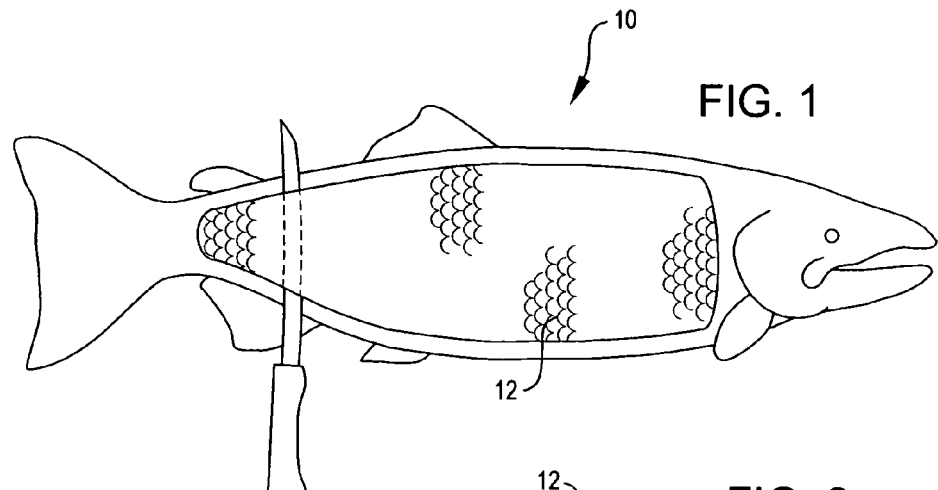
FIG. 1 is a perspective view of a fish, such as a salmon, showing a fillet being cut from the side of the fish.

Referring to the drawings and in particular to FIG. 1, a representative fish 10 suitable for use with the invention is shown. As illustrated, a fillet 12 is removed from each side of the fish by slicing the fish along the backbone between the tail and head. In the illustrated embodiment, the fish 10 is a salmon. It will be appreciated, however, that the particular type of fish is not limiting and the invention can be advantageously used with a variety of fish. Although also not limiting, the invention is particularly advantageous for use with larger fish wherein each fillet may be relatively large and capable of providing more fish than can reasonably be consumed by one or two people in a single meal.

Figure 2:
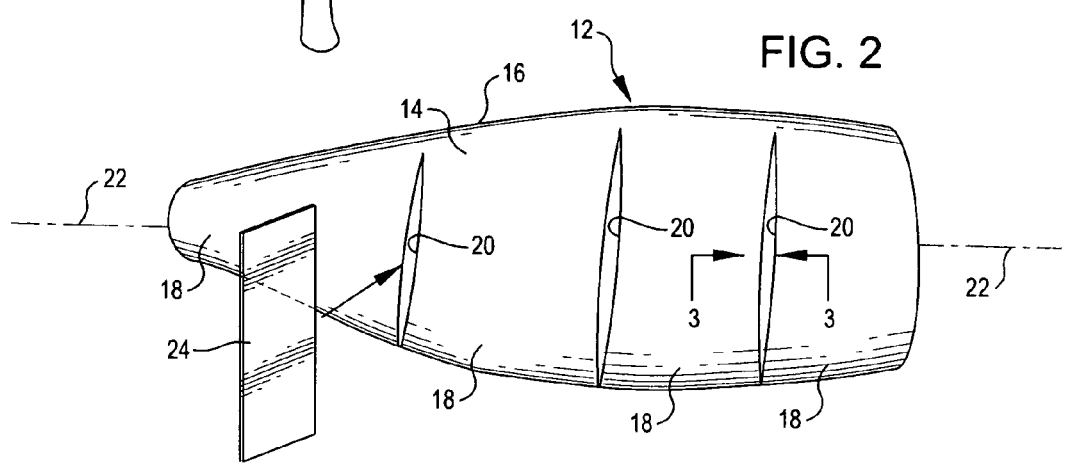
FIG. 2 is a perspective view of the fillet shown in FIG. 1, after the fillet has been processed in accordance with one aspect of the invention.
Figure 3:
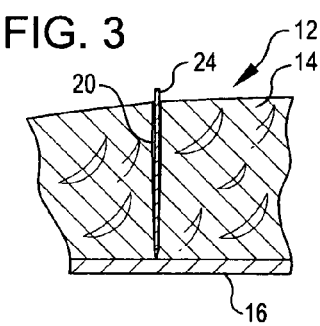
FIG. 3 is a cross-sectional view of the fillet illustrated in FIG. 2 taken along line 3—3 thereof.
Figure 4:
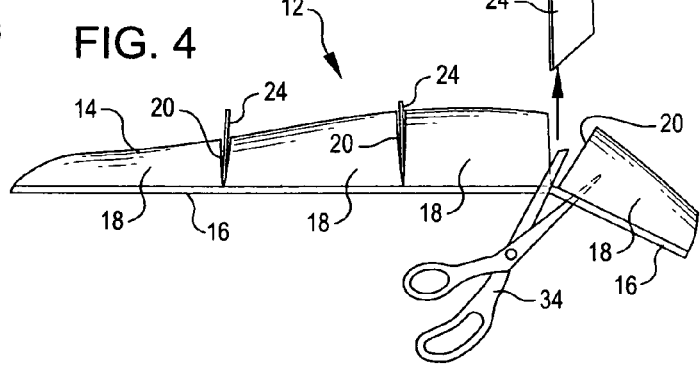
FIG. 4 is side elevation view of the fillet shown in FIGS. 1–3, showing the manner in which a desired portion of the fillet can be separated from the remainder.

As shown in FIG. 2, each fillet 12 comprises a slab-like section of flesh 14 with the skin 16 of the fish 10 remaining attached to one side. In accordance with one aspect of the invention, each fillet 12 is divided into two or more portions 18 by means of one or more cuts 20 made through the flesh 14 of the fish 10 generally transversely to the longitudinal axis 22 thereof and generally perpendicularly to the skin 16. Each cut 20 extends down to but not through the skin 16 so that the fillet 12 remains a substantially unitary member held together by the uncut skin 16. Additionally, each cut 20 terminates short of the upper edge of the fillet so that a strip of uncut flesh extends across the upper edge of the fillet. This, too, helps keep the fillet together as a single unit after the cuts are made.

After the cuts 20 are made, a separating structure is inserted into each cut to allow each cut to separate easily even after the fillet is frozen. Preferably, each separating structure takes the form of a strip of waxed paper, parchment paper, or freezer paper or the like 24 shaped and dimensioned to fit within each cut 20. The paper strips 24 function to hold the edges of cuts 20 out of contact with each other so that after freezing, the edges of the cuts do not adhere strongly to each other. The use of waxed paper, parchment paper or freezer paper 24 substantially avoids adhesion between the flesh and the paper and further facilitates separating the fillet along each cut 20.

Preferably, the cuts 20 are numbered and spaced so that each fillet 12 is divided into two or more portions wherein each portion can reasonably be consumed by a single person in a single meal. Although not limiting, this can, for example, result in dividing each fillet into portions 18 comprising approximately 8 ounces of fish per portion. Other portion sizes can, of course, be used.

After the cuts 20 are made and the separators 24 inserted, the fillet 12 can then be packaged for wholesale or retail distribution. Preferably the fillet 12 is frozen and packaged in a flexible plastic sleeve 26 having a resealable closure 28 at one end (FIG. 5). The package 26 can include a transparent window 30 to enable the fillet 16 to be seen by consumers before and after purchase and can include product information and use instructions 32 printed on both the front and back.

In use, the frozen fillet 12 is removed from the package 26 and the consumer decides how much of the fillet is to be cooked at that time. Although the entire fillet can, of course, be cooked at once, the consumer can elect to cook less than the entire fillet. To do this, the consumer can bend the frozen fillet along one of the cuts 20 between the portions 18. Thereafter, the skin 16 between the portions 18 can be cut with a scissors 34 or knife to separate the portion 18 from the remainder of the fillet 12. The remainder of the fillet 12 can then be returned to the resealable package 26 and then to a freezer for use at a later date. It will be appreciated that as much or as little of the fillet 12 can be used at a time by separating the fillet along the appropriate cut 20. It will also be appreciated that the paper separators 24 should be removed before cooking whether the entire fillet is being cooked or only some of the individual portions 18.

Although the invention finds particular use with salmon fillets, it will be appreciated that the invention is not so limited in its broader aspects and that other types of fish can be used. It will also be appreciated that the precise number of cuts 20, their size, location and orientation are also not critical to the invention in its broader aspects.

While a particular embodiment of the invention has been shown and described, it will be apparent to those skilled in the art that changes and modifications can be made without departing from the invention in its broader aspects, and, therefore, the aim in the appended claims is to cover all such changes and modifications as fall within the true spirit and scope of the invention

What is claimed is:

1. A pre-portioned fish fillet comprising
   a fish fillet having fish flesh on one side and skin on the other;
   a cut extending at least partially through said flesh of said fillet but not through said skin; and
   a separator positioned in said cut permitting separation of said flesh along said cut after said fillet is frozen.

2. A pre-portioned fish fillet as defined in claim 1 wherein said fillet includes a longitudinal axis and wherein said cut extends generally transversely to said longitudinal axis.

3. A pre-portioned fish fillet as defined in claim 2 wherein said cut extends generally perpendicularly to said skin of said fillet.

4. A pre-portioned fish fillet as defined in claim 3 wherein said fillet includes an upper edge and said cut terminates short of said upper edge so that a substantially uncut strip of flesh remains adjacent said upper edge of said fillet.

5. A pre-portioned fish fillet as defined in claim 4 wherein said separator comprises a strip of flexible material exhibiting low adhesion to said flesh when said flesh and said separator are frozen.

6. A pre-portioned fish fillet as defined in claim 5 wherein separator is formed of paper.

7. A pre-portioned fish fillet as defined in claim 6 wherein said paper is selected from the group consisting of waxed paper, parchment paper and freezer paper.

8. A pre-portioned fish fillet as defined in claim 7 further comprising an outer sleeve for containing and storing said fillet.

9. A pre-portioned fish fillet as defined in claim 8 wherein said outer sleeve is formed of flexible plastic and includes a resealable closure at one end.

10. A pre-portioned fish fillet as defined in claim 9 wherein said fillet includes a plurality of cuts and said separators.

11. A pre-portioned fish fillet as defined in claim 10 wherein said cuts are positioned so as to divide said fillet into two or more individual portions, each sized to serve 1 to 2 people.

12. A method of producing a pre-portioned fish fillet comprising the steps of:
    removing from the side of a fish a fillet section having a flesh side and a skin side;
    subdividing said fillet into two or more portions by cutting through said flesh side but not fully through said skin side of said fillet;
    inserting a separator into the cut formed in said flesh side; and
    freezing said fillet with said separator inserted in the cut.

13. A method as defined in claim 12 wherein said cut is formed generally transverse to the longitudinal axis of the fillet.

14. A method as defined in claim 13 wherein said cut does not extend fully across said fillet so that a substantially uncut strip of flesh remains along one end of the fillet.

15. A method as defined in claim 14 wherein said step of inserting a separator includes the step of inserting a paper strip into the cut.

16. A method as defined in claim 15 wherein said step of inserting a paper strip includes the step of inserting a paper strip selected from the group consisting of waxed paper, parchment paper and freezer paper.

17. A method as defined in claim 16 wherein said step of subdividing includes the step of forming a plurality of the cuts in the flesh side of the fillet.

18. A method as defined claim 17 comprising the further step of separating a portion of said fillet along one of the cuts before cooking.

19. A method as defined in claim 17 comprising the further step of inserting said fillet into a flexible plastic sleeve having a resealable closure at one end.

20. A pre-portioned fish fillet product comprising:
    a fish fillet having fish flesh on one side and skin on the other;
    a plurality of cuts extending at least partially through said flesh of said fillet but not through said skin so as to subdivide said fillet into two or more portions, said cuts extending substantially across said flesh but terminating short of one edge thereof so that a substantially uncut strip of flesh extends substantially fully along one edge of said fillet, said cuts permitting separation of said flesh along said cut after said fillet is frozen;
    a paper separator positioned in each of said cuts; and
    an outer packaging sleeve for containing and storing said fillet, said outer packaging sleeve being formed of flexible plastic and including a resealable closure at one end.

* * * * *